(12) United States Patent
Cheng

(10) Patent No.: US 7,352,596 B2
(45) Date of Patent: Apr. 1, 2008

(54) METHOD OF OPERATING A RESONANT PUSH-PULL CONVERTER IN AN ABOVE RESONANT FREQUENCY MODE

(75) Inventor: Wing Ling Cheng, Taipo (HK)

(73) Assignee: Astec International Limited, Kwun Tong (HK)

( * ) Notice: Subject to any disclaimer, the term of this patent is extended or adjusted under 35 U.S.C. 154(b) by 56 days.

(21) Appl. No.: 11/021,763

(22) Filed: Dec. 23, 2004

(65) Prior Publication Data

US 2006/0139970 A1    Jun. 29, 2006

(51) Int. Cl.
*H02M 3/335* (2006.01)

(52) U.S. Cl. ....................................................... 363/24

(58) Field of Classification Search ................ 363/24, 363/25, 134, 133
See application file for complete search history.

(56) References Cited

U.S. PATENT DOCUMENTS

| | | | |
|---|---|---|---|
| 4,628,426 A * | 12/1986 | Steigerwald | 363/17 |
| 4,959,765 A | 9/1990 | Weinberg | 360/20 |
| 5,113,334 A | 5/1992 | Tuson et al. | 363/25 |
| 5,177,675 A * | 1/1993 | Archer | 363/25 |
| 6,169,668 B1 * | 1/2001 | Clayton | 363/26 |
| 6,490,175 B2 * | 12/2002 | Raets et al. | 363/17 |

OTHER PUBLICATIONS

Weinberg, et al., "A New Zero Voltage and Zero Currents Power-Switching Technique", IEEE Transactions on Power Electronics, vol. 7, No. 4, Oct. 1992.

* cited by examiner

*Primary Examiner*—Shawn Riley
(74) *Attorney, Agent, or Firm*—Nixon Peabody LLP

(57) ABSTRACT

A method for operating a push-pull converter in an above resonant frequency operating mode, where the above resonant frequency operating mode produces a switching frequency that is higher than the natural operating resonant frequency of the converter circuit. As a result, the resonant period is longer than the turn-on period of each of the switches in the primary circuit. The push-pull converter has two power switches operating in alternating sequence. The push pull converter also includes a transformer with a primary winding coupled to the power switches and a secondary winding coupled to a secondary circuit, and an output capacitor. The method also includes generating an operating resonant frequency from a leakage inductance of the transformer in series with a an input capacitance; and generating a switching frequency for the power switches that is higher than the operating resonant frequency.

13 Claims, 7 Drawing Sheets

METHOD OF OPERATING A RESONANT PUSH-PULL CONVERTER IN AN ABOVE RESONANT FREQUENCY MODE

BACKGROUND OF THE INVENTION

Field of Invention

The present invention relates generally to electrical power converters and more particularly to dual switching converters such as resonant half-bridge or push-pull DC-DC power converters.

Power converters with high power density must operate at a higher frequency in order to minimize the volume of magnetic components and capacitors. As the frequency is increased, switching losses of the switching and rectifying devices in the converter become more and more significant. To reduce such switching losses at high frequency, resonant or quasi-resonant switching of the switching devices at a zero voltage and/or zero current condition is performed. This is commonly referred to as zero voltage switching (ZVS) and zero current switching (ZCS).

One conventional type of resonant or quasi-resonant power converter that operates at high switching frequencies is a push-pull converter. Examples of such converters are disclosed in U.S. Pat. No. 5,113,334 to Tuson, et al., and U.S. Pat. No. 4,959,765 to Weinberg. FIG. 1A is a circuit diagram showing the differences between the push-pull converter shown in FIG. 3 of Weinberg with the push-pull converter shown in FIG. 1 of Tuson, et al. The resonant converters in Weinberg and Tuson, et al. are both ZVS/ZCS converters that produce very soft switching across switches S1 and S2. Switches S1 and S2 operate in alternate fashion driven by gate drive circuits that are 180 degrees out of phase. A small dead-time is generated between each switch transition of switches S1 and S2 to enable ZVS switching to occur. The transformer T is an isolation transformer that is arranged in a conventional push-pull fashion with a capacitance Cin (and an inductor Lin in the Weinberg circuit). The secondary side of transformer T includes a full wave rectifier comprising diodes DoA and DoB and an output capacitor Co. The leakage inductance of transformer T forms a series resonant circuit with Cin and/or the reflected secondary capacitance Co. Lin is a choke that isolates the resonant tank circuit from the low impedance of the input voltage source Vin and helps reduce input ripple current. Additional smoothing passive elements Lf and Cf may also be added (as shown in the Tuson, et al. circuit), to reduce output noise and ripple current on the output voltage Vout.

Although the push-pull converter circuits used by Weinberg and Tuson, et al. are substantially the same, they operate differently and have significantly different component values. In the Tuson, et al. circuit, the leakage inductance and the reflected output capacitance Co generate the main sinusoidal resonant current. Cin is used for filtering and needs to have a value large enough to maintain a low ripple voltage at the input of the converter. The on-period resonant frequency of the Tuson, et al. circuit is partially controlled by the value of Co. This constraint limits the freedom of the circuit designer, since it prevents the use of a larger value of capacitance for Co that would otherwise be available to reduce the output ripple voltage of that circuit. As a result, the Tuson, et al. circuit requires a filter inductor and a second output filter capacitor to reduce ripple in the output voltage.

The Weinberg circuit, by contrast, uses the leakage inductance and the input capacitance Cin to generate the main sinusoidal resonant current. The output capacitance in Weinberg is free to be large enough to reduce the ripple in the output voltage. No additional output filter capacitor is needed. At the input side of the converter, however, an input filter inductor is required to isolate the input voltage source Vin from capacitor Cin.

In practical push-pull converter designs, the input and output filter inductors are usually present. The control signals and switching for both circuits are also usually similar. What distinguishes the two circuits are the values of Cin and Co. In the Tuson, et al. circuit, the input capacitance Cin is small and the output capacitance Co is large.

Prior art push-pull converters taught by Weinberg operate in a below resonant frequency operational mode. That is, the switching frequency of the switches S1 and S2 is below the resonant frequency of the circuit. Said another way, the switch on period is longer than the resonant period. Tuson, et al. doesn't teach whether the circuit runs at a below resonant frequency mode or not. It does, however, teach that a finite current is flowing when a push-pull switch is turned off.

The operation of a push-pull converter in a below resonant frequency operating mode is illustrated by the waveforms shown in FIGS. 1B and 1C, based on a sample set of simulation data. Each waveform in FIGS. 1B and 1C are described below in Table 1. In these diagrams, the switching frequency is selected to be 500 KHz.

TABLE 1

| | |
|---|---|
| GD1, GD2 | Gate drive signal of S1 and S2, 500 KHz, 250 ns deadtime |
| IS1 | Current waveform passing thru switch S1, RMS value 1.156 A |
| ID1 | Current waveform passing thru diode DoA, RMS value 7.418 A |
| Vout | Output voltage of the converter 7.431 V |
| Cin | 68 nF such that resonant period is shorter than S1 on period |
| Lm | Magnetizing inductance - centre tap to phase, 27 µH for a desirable secondary rectifier waveform |

In the example shown in FIG. 1C, the resonant frequency of the primary circuit was determined by the value of capacitor Cin only. The resonant period is determined by measuring the ¼ cycle time from when switch S1 is turned on to the peak of the primary switch circuit. The full half-cycle point is obtained by doubling the ¼ cycle time. As shown in FIG. 1C, the resonant period is shorter than the switch on period.

Accordingly, what is needed is a method that achieves higher efficiency in a push-pull power converter or other two switch resonant converter, such as a resonant half-bridge converter.

SUMMARY OF THE INVENTION

The present invention is a method for operating a push-pull converter or the like in an above resonant frequency operating mode, i.e., where the push-pull converter switching frequency is higher than the resonant frequency of the circuit. The resonant period is therefore longer than the turn-on period of each power switch in the primary circuit.

Advantageously, the present invention reduces conduction losses by reducing the non-power delivery time period, also know as "dead-time", which reduces unnecessary magnetizing current induced conduction loss on the primary side. Moreover, the present invention advantageously provides the use of a higher switching frequency for the same transformer parameters, thereby reducing the output ripple with the same output capacitance. Furthermore, the present invention advantageously reduces the secondary rectifier RMS current by altering the form factor of the secondary waveform, effectively reducing the conduction loss on the rectifier. These advantages are provided without affecting the characteristics of a ZVS or ZCS converter.

Other structures and methods are disclosed in the detailed description below. This summary does not purport to define the invention. The invention is defined by the claims. These and other embodiments, features, aspects, and advantages of the invention will become better understood with regard to the following description, appended claims and accompanying drawings.

Reference symbols or names are used in the Figures to indicate certain components, aspects or features therein, with reference symbols common to more than one Figure indicating like components, aspects or features shown therein.

DETAILED DESCRIPTION

Figure 1A:
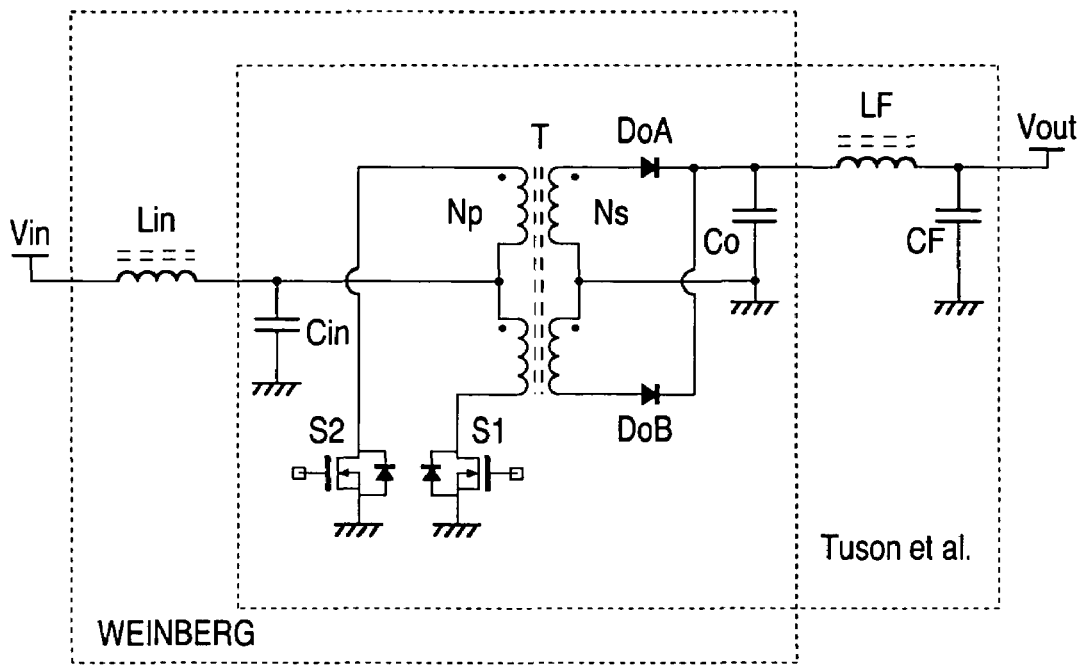
FIG. 1A is a schematic diagram that compares the design of two different resonant push-pull converters according to the prior art.
Figure 1B:
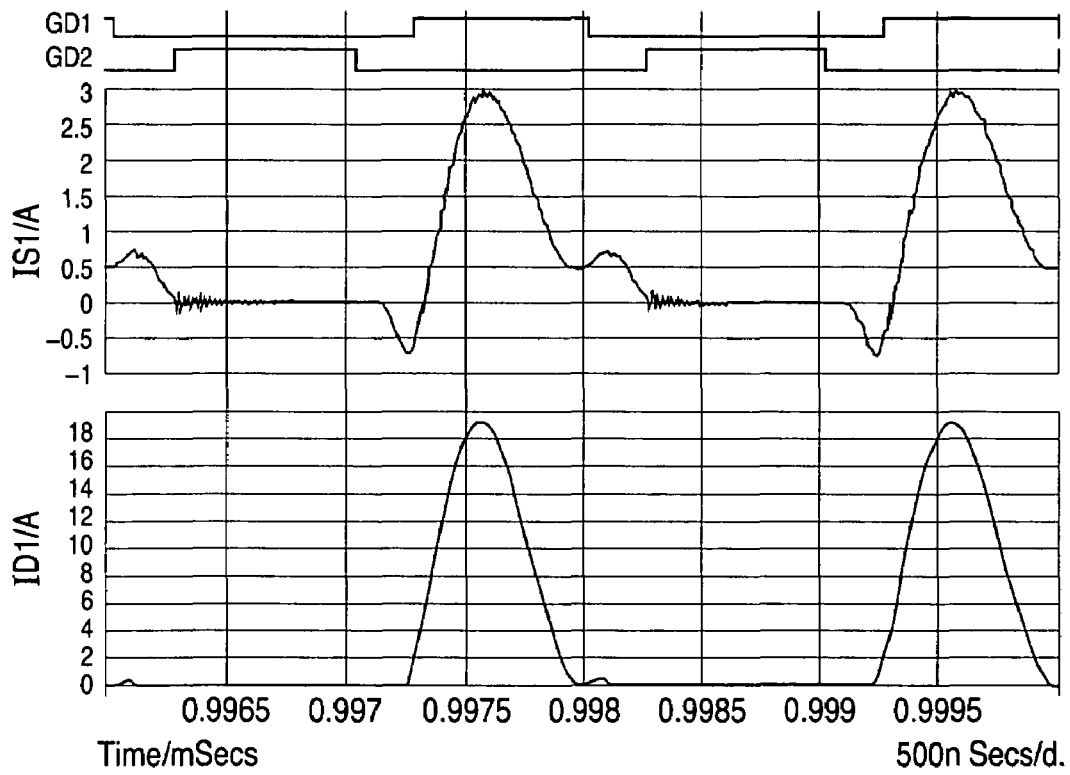
FIGS. 1B and 1C are conventional graphical diagrams illustrating waveforms of a conventional resonant push-pull converter as shown in FIG. 1A that operates in a below resonant frequency operational mode.
Figure 1C:
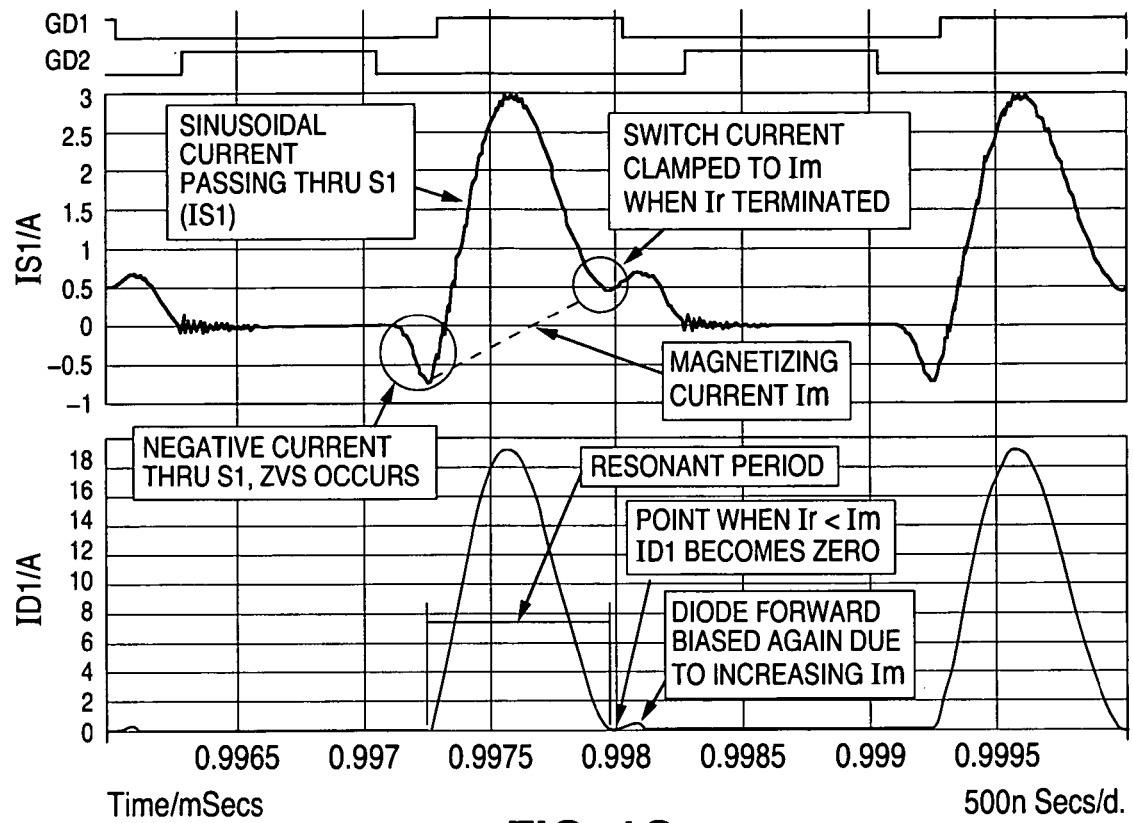
Figure 2:
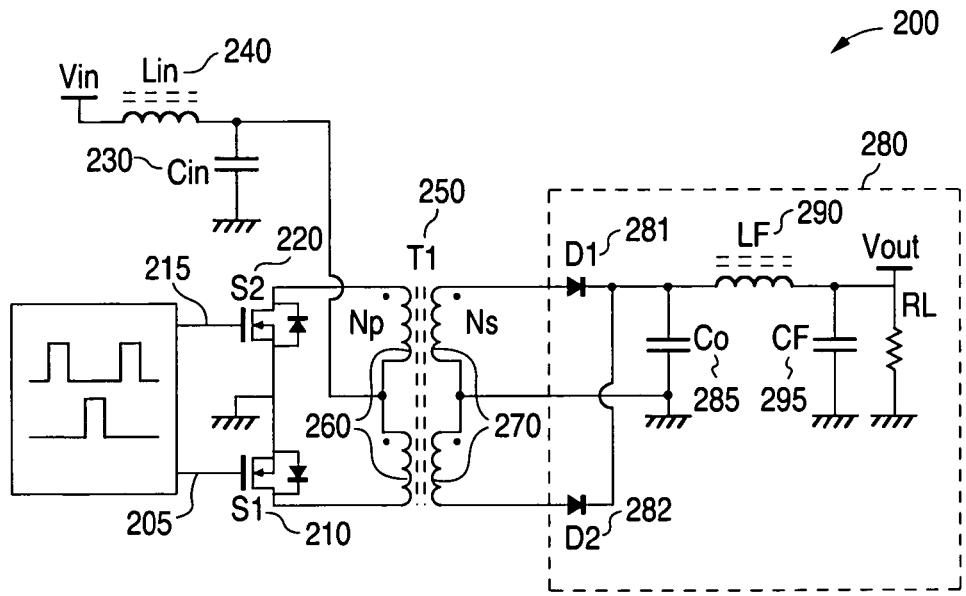
FIG. 2 is a schematic diagram illustrating a resonant push-pull converter operating in an above resonant frequency operational mode in accordance with the present invention.

Referring now to FIG. 2, there is shown a schematic diagram illustrating a resonant push-pull converter 200. The resonant push-pull converter 200 is a zero voltage switching (ZVS) converter. The resonant push-pull converter 200 comprises a first primary switch S1 at 210, a second primary switch S2 at 220, an input capacitor Cin at 230, an inductor Lin at 240, an isolation transformer T1 at 250, a primary winding 260, a secondary winding 270, and a secondary circuit 280. The secondary circuit 280 includes a full wave rectifier comprising a diode D1 at 281 and a diode D2 at 282 which feed an output capacitor Co at 285.

The primary switches S1 and S2 operate in an alternating mode. The first primary switch S1 is driven by a gate drive signal 205, while the second primary switch S2 is driven by a gate drive signal 215, such that the first primary switch S1 and the second primary switch S2 are operated 180 degrees out of phase with one another. There is a small non-overlapping period, or dead-time between the turn off time of one switch and the turn on time of the other switch to enable the proper operation in the resonant push-pull converter 200.

The isolation transformer T1 includes a leakage inductance (not shown). The leakage inductance of the isolation transformer T1 forms a series resonant circuit with the input capacitor Cin and/or a reflected or output secondary capacitance Co. Inductor Lin functions as a choke that isolates the resonant tank circuit from the low impedance Vin, which contributes to the reduction of the input ripple current.

Figure 3:
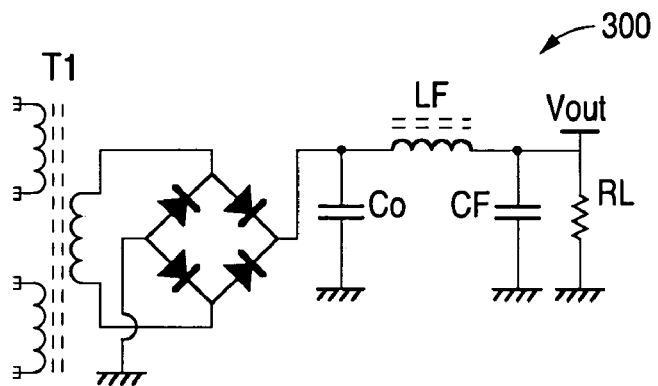
FIG. 3 is a schematic diagram illustrating a secondary circuit implemented using a bridge rectifier instead of a full-wave rectifier to provide bi-directional conduction in the resonant push-pull converter in accordance with the present invention.
Figure 4:
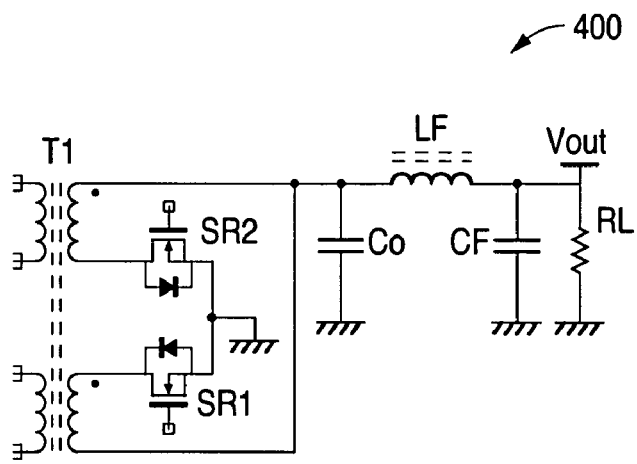
FIG. 4 is a schematic diagram illustrating a secondary circuit implemented using synchronous rectifiers to further reduce conduction losses in the resonant push-pull converter in accordance with the present invention.

The secondary circuit 280 in the resonant push-pull converter 200 can also be implemented using a bridge rectifier 300 as shown in FIG. 3, or with synchronous rectifiers as shown at 400 FIG. 4, to provide bi-directional conduction for capacitor Co. The synchronous rectifiers in FIG. 4 can also be used to further reduce conduction losses if a suitable gate drive for these rectifiers is provided. Referring again to FIG. 2, a filter inductor LF at 290 and an output filter capacitor CF at 295 can be added to secondary circuit 280 to provide additional smoothing to reduce noise and ripple in the output voltage.

Figure 5:
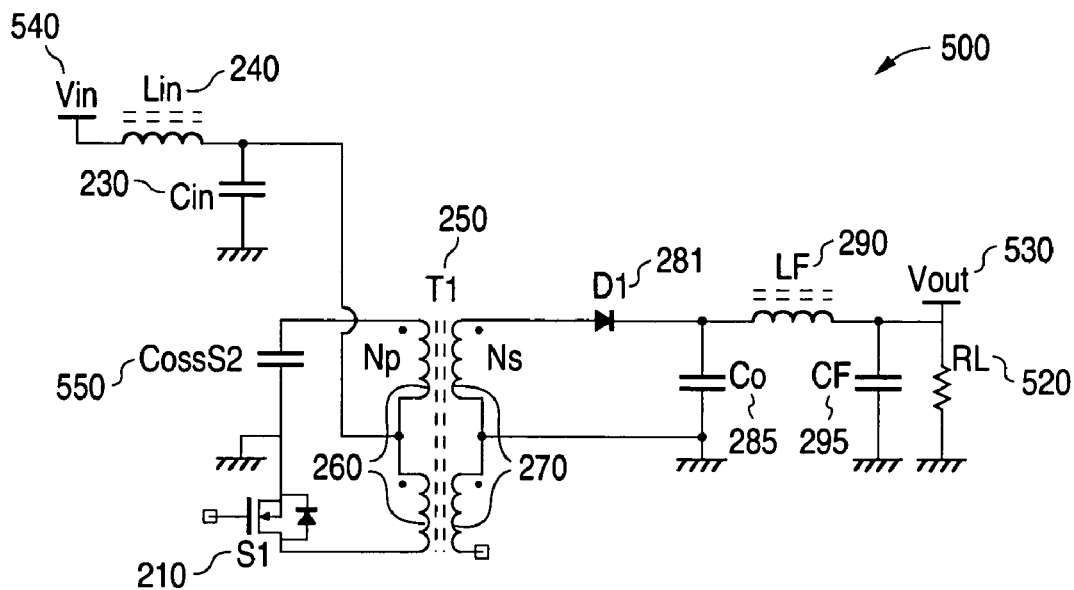
FIG. 5 is a schematic diagram illustrating half the resonant push-pull converter when the switch S1 is turned ON while the switch S2 is turned OFF in accordance with the present invention.

The resonant push-pull converter 200 can be viewed as two identical halves that operate with the same mechanism but alternating at 180 degree intervals as a function of the states of switches S1 and S2. Turning now to FIG. 5, there is shown a schematic diagram illustrating a first half of a resonant push-pull converter 500 when the first primary switch S1 is ON while the second primary switch S2 is OFF. The resonant push-pull converter first half 500 is in a state wherein the first primary switch S1 is turned ON, as represented by a closed switch, while the second primary switch S2 is OFF or open as represented by its switch capacitance, CossS2 at 550. The secondary side includes one half of secondary winding 270, diode D1 and capacitor Co. The output voltage Vout at 530 is shown coupled across a load resistor RL at 520.

Figure 6:
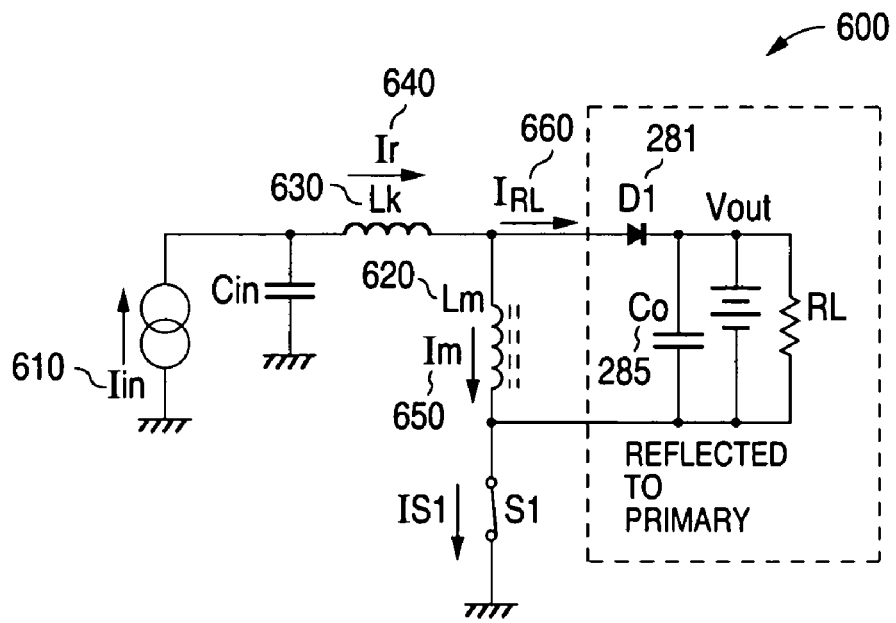
FIG. 6 is a schematic diagram illustrating an equivalent circuit of the circuit of FIG. 5 in accordance with the present invention.

The circuit of FIG. 5 can be further simplified and reduced to an equivalent circuit, as shown in FIG. 6. FIG. 6 is a schematic diagram illustrating an equivalent circuit 600 of the half resonant push-pull converter first half 500, when the primary switch S1 is turned ON while the primary switch S2 is turned OFF. The input voltage Vin at 540 in FIG. 5 in combination with the choke inductance Lin becomes a current source Iin at 610 in FIG. 6. The effect of the switch capacitance CossS2 of the second primary switch S2 and the reverse biased diode capacitance of D1 can be lumped across the reflected capacitor Co to become negligible. The reflected secondary load and capacitance appear across a magnetizing inductance Lm at 620. The leakage inductance is represented by an inductance Lk at 630. An electrical current Ir 640 is a half-wave sinusoidal current segment and an electrical current Im 650 is the magnetizing current component. As a result, the electrical current that goes into the load through diode D1, shown as IRL 660, is IRL=Ir−Im.

Figure 7:
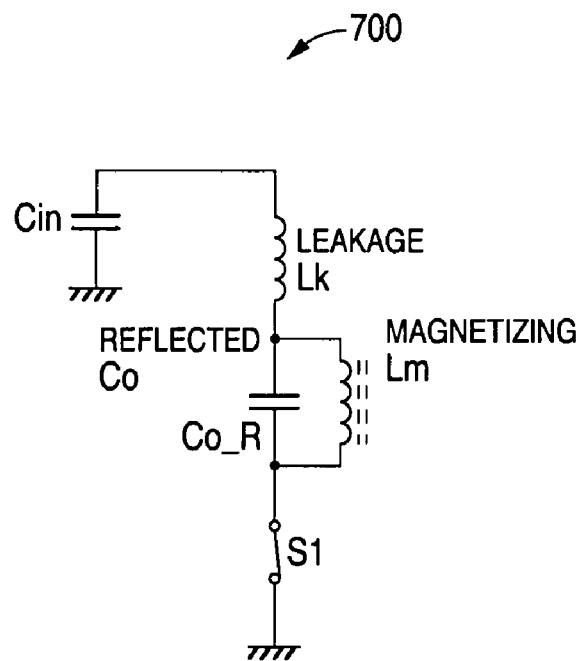
FIG. 7 is schematic diagram illustrating a second level equivalent circuit of the circuit of FIG. 5 in accordance with the present invention.

FIG. 7 is a schematic diagram illustrating a second level of the equivalent circuit shown at 600 in FIG. 6. In this second level equivalent circuit, at 700, the output capacitance Co and load resistance RL are shown as an impedance Co_R reflected back to the primary side of the transformer T1 (shown in FIG. 5) in parallel with the magnetizing inductance Lm.

According to the present invention, the magnetizing current Im and the current Ir through the leakage inductance Lk both provide the energy necessary to provide the zero voltage switching turn-on condition of the opposite switch. In general, the magnetizing current has a dominant effect on the ZVS condition. To obtain a perfect ZVS condition, the magnetizing current has to be sufficiently high. In practice, a high magnetizing current causes additional dissipation in a transformer's windings and reduces the current deliverable to the secondary circuit. In order to maintain the same output current, an effectively higher primary resonant current is needed.

When the switching period is shorter than the natural resonant period of the converter, the primary switch from on-to-off transition occurs at a point when there remains a finite load current flowing through the primary leakage inductance Lk. A portion of energy that is needed to produce ZVS is carried by the energy in the leakage inductance Lk. To optimize the converter's performance, the following factors are considered and balanced, IRL RMS value, the magnetizing current, and the primary resonant current in order to obtain the desired better efficiency performance of converter 200.

Figure 8:
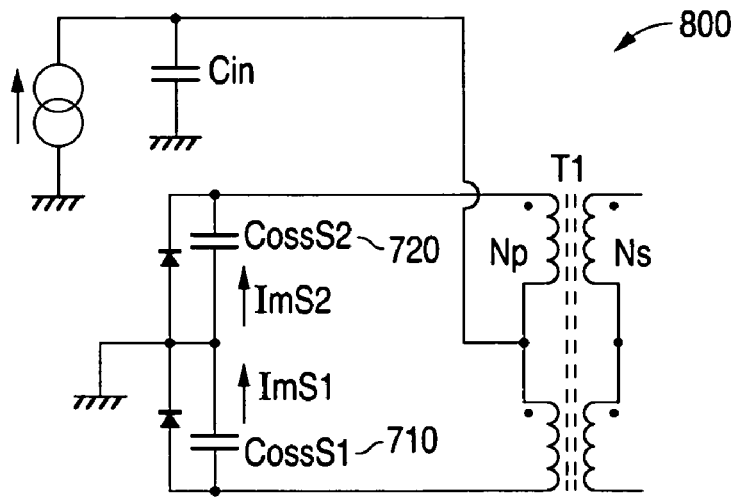
FIG. 8 is a schematic diagram illustrating an equivalent circuit during the transition period (dead-time) when the first primary switch S1 is turned OFF but before the second primary switch S2 is turned ON in accordance with the present invention.

FIG. 8 is a schematic diagram illustrating the equivalent circuit 800 during a transition period when the first primary switch S1 is turned OFF but before the second primary switch S2 is turned ON. In this transition period, the magnetizing current Im will have a magnitude greater than the decaying resonant current. The net current delivered to the load will then cease. The secondary rectifier will stop conduction and effectively disconnect the low impedance load of the secondary circuit. The electrical current through the first primary switch S1 will be clamped to Im after the point where Ic<Im and will not continue to fall to zero as in a half sinusoid. Im will keep increasing as determined by the input voltage Vin and the magnetizing inductance. When the first primary switch S1 is turned OFF, the magnetizing current Im will charge the switch capacitance of S1 and the Vds of switch S1 will rise at a rate determined by the magnetizing current and the capacitance Coss of the switch. At the same time, the Vds of the open-circuit switch S2 will fall by symmetry and transformer action. The magnetizing current Im discharges the Coss 720 of S2 at the same time that it charges Coss 710 of the first primary switch S1. Once the Vds of the second primary switch S2 falls below ground, its body diode will be set into conduction. The magnetizing current Im is then transferred to the second primary switch S2, the first primary switch S1 is typically turned OFF at low current and the low Vds rise time makes the turn off transition practically ZVS and ZCS.

For switching devices, since it takes finite time to change from on-off or off-on state, there is a cross-over of voltage across the switch and current thru the switch. The energy loss is given by:

$$Esw = \int_0^{tsw} Vsw(t) \cdot Isw(t) \, dt$$

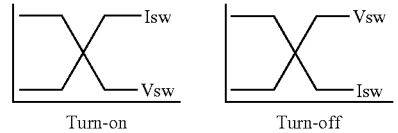

Turn-on            Turn-off

Where tsw is the switching time, Vsw(t) is the time varying quantity of voltage across the switch during tsw, and Isw(t) is the time varying quantity of current thru the switch during tsw.

ZVS and ZCS reduce switching loss by lowering the levels of the crossover. ZVS and ZCS can be used individually or together depending on the characteristic of a given circuit topology.

In addition to the loss caused by the current crossover, there is also a kind of turn-on loss that originates from the inherent output capacitance (or adjacent capacitance) of a switching device. Given by the well know relationship:

$$Ecv = \frac{1}{2} \cdot Csw \cdot Vsw^2$$

The turn-on loss is proportional to the output capacitance of the device and the square of the voltage across the device. If the particular device has a high output capacitance (like a MOSFET, which typically has an output capacitance from a few pF to hundreds of pF), or there is additional capacitance across the switch as a requirement of a given circuit's topology, ZVS is important in reducing power dissipation. For low to medium power applications, the choice of switching device is almost entirely MOSFET. For this reason, more emphasis is put on ZVS rather than ZCS switching. More attention is also put on the turn-on transition when there is an ½CV² loss.

Figure 9:
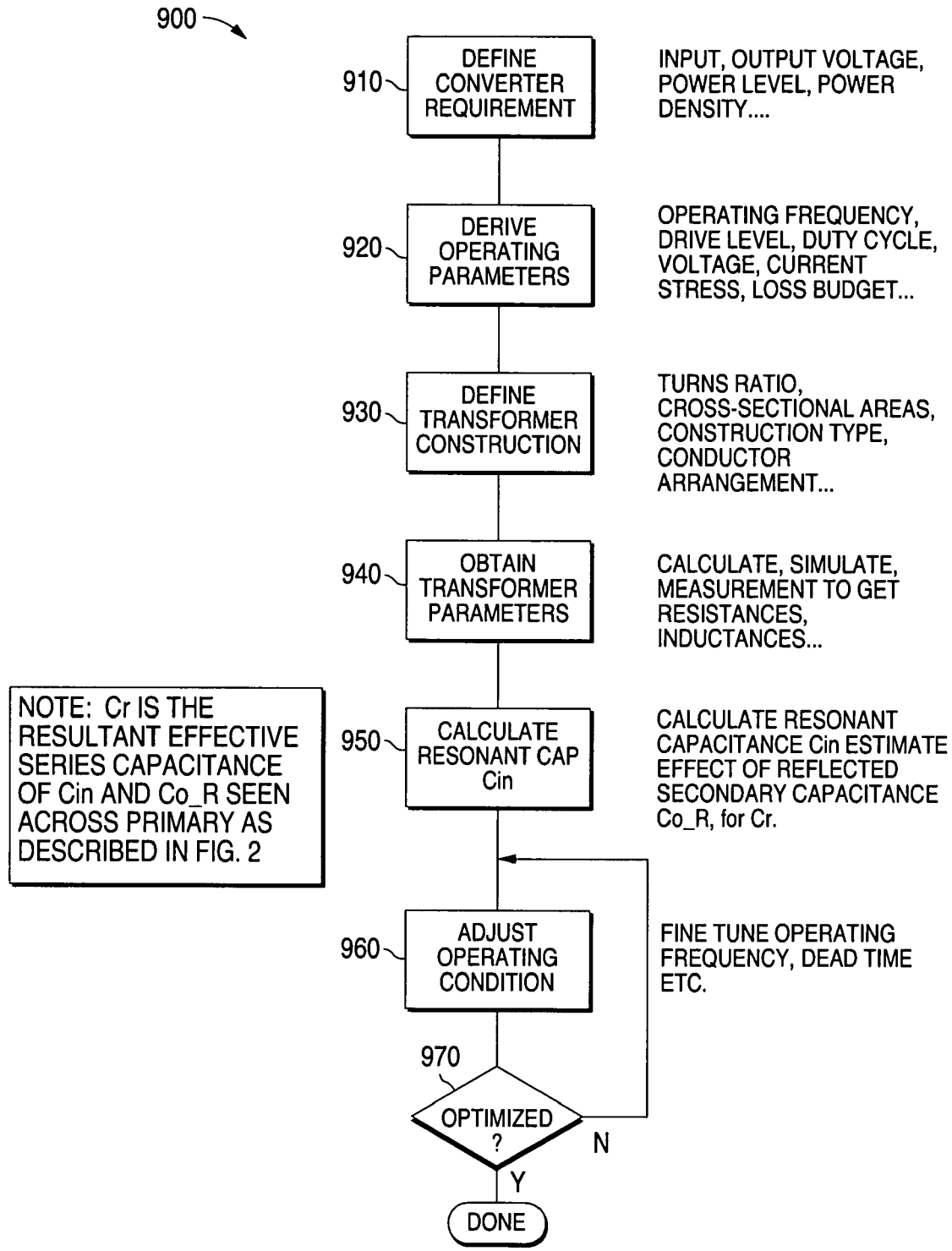
FIG. 9 is a flow chart illustrating the process of designing a resonant push-pull converter so as to operate in an above resonant frequency mode in accordance with the present invention.

FIG. 9 is a flow chart illustrating the process 900 of designing a resonant push-pull converter 200 in the above resonant frequency mode according to the present invention. At step 910 of the process 900, the designer defines the desired requirements for the resonant push-pull converter 200, including its input voltage, output voltage, the power level, power density, etc. At step 920 of the process 900, the designer defines a set of operating parameters, such as the operating frequency, the drive level, and the duty cycle. The process step 930, the designer defines the transformer's construction, including its turns ratio, cross-sectional areas, construction type, and conductor arrangement. At step 940, the designer obtains the transformer's parameters by calculating, simulating, and measuring to obtain resistances, inductance values, etc. At step 950, the designer calculates the resonant capacitance, Cin, and estimates the effect of the reflected secondary capacitance Co_R. At step 960, the designer adjusts the operating conditions by fine-tuning the operating frequency and the dead time.

A specific example of each of the above steps is as follows:

At step 910, the converter's requirements are defined as in the following example:

| Input voltage | 48 V |
|---|---|
| Output voltage | 7.5 V |
| Output current | ~7.5 A DC |
| Output Power | 56 W |
| Output Ripple voltage | <100 mV p-p |
| Load Regulation | Better than 7% from 10% to 100% load |
| Efficiency | >85% |
| Size | 1.5" × 1.5" × 0.8" |

At step 920, the operating parameters are defined as in the following example:
Select Switching frequency at 500 KHz
Using Schottky Diodes as Rectifier device
Diode Current thru rectifier ~20 A peak, ~6.74 ARMS select 15 A rectifier
Rectifier Peak Reverse voltage around 2.2 times, use 35V Schottky diode.

At step 930, the transformer's construction is defined as in the following example:
Turns Ratio Primary Terminal-Center Tap: Secondary Terminal-Center Tap determined by:
Voltage-Input Vin:=48 Voltage-Output Vout:=7.5 Diode Drop Vdiode_drop:=0.5
Ignore forward switch voltage drop Transformer turns Ratio $N := \frac{Vin}{(Vout + Vdiode\_drop)}$ $N = 6$ Planar Magnetic structure, this is a choice for small size
Select magnetizing inductance such that at 500 KHz switching frequency and 48V input, peak-peak magnetizing current swing is ~+/−0.5 A to allow sufficient energy to cause ZVS.

Switching frequency $fs := 500 \cdot 10^3$ Period $\tau := \frac{1}{fs}$ $\tau = 2 \times 10^{-6}$ Magnetizing Current requirement $Imag := 0.5 - (-0.5)$ $Imag := 1$ Magnetizing Current Relationship $Vin = Lmag \cdot \frac{\Delta I}{\Delta t}$ $Vin = Lmag \cdot \frac{Imag}{\Delta t}$ Actual turn-on time is approx 75% of period $\Delta t := 0.75 \cdot \frac{\tau}{2}$ $Lmag := \frac{Vin}{Imag} \cdot \Delta t$ $Lmag = 3.6 \times 10^{-5}$ Calculated Imag is 36 uH actual set to 27 uH.

At step 940, the transformer's operating parameters are obtained, as in the following example:
First calculate transformer core size and calculate actual number of turns:
Transformer Cross-sectional Area selection
Select transformer number of turns and Transformer core cross-sectional area such that
number of turns is reasonable and at 500 KHz operation, peak flux density is around 50 mT $Vin =$ $N \cdot \frac{\Delta B \cdot Ae}{\Delta t}$ Set $Vin := 48$ Switching Period $\Delta t := 0.75 \cdot \frac{\tau}{2}$ Set Core crossectional area $Ae := 63 \cdot 10^{-6}$ Correspond to RM-8 geometry Primary turns, Centre Tap to one side $Np := 6$ $\Delta B := \frac{Vin}{Np \cdot Ae} \cdot \Delta t$ $\Delta B = 0.095$ Peak Flux swing $\frac{\Delta B}{2} = 0.048$ Recalling our turns ratio is 6:1, Now we have actual primary turns=6, secondary turns=1
Calculate magnetizing inductance and air gap based on 27 uH requirement.
Calculate equivalent permeability of the core based on core effective path length Lcore
Core material permeability $\mu r$, and permeability of air $\mu o$, when Lgap is large enough the inductance is almost entirely determined by Lgap and $\mu o$.

$\frac{1}{\mu eq} = \frac{Lcore \cdot \frac{1}{\mu r} + Lgap \cdot \frac{1}{\mu air}}{Lcore + Lgap}$ $\mu eq = \mu r \cdot \mu o \cdot \frac{(Lcore + Lgap)}{(Lcore \cdot \mu air + Lgap \cdot \mu r)}$ Here we use standard RM-8 core low profile geometry Lcore $:= 28.7 \cdot 10^{-3}$
Set air gap to Lgap $:= 0.1 \cdot 10^{-3}$ Set $\mu r := 2200$ For high frequency material
Relative Permeability of air $\mu air := 1$ Equivalent Permeability is $\mu eq := \mu r \cdot \mu air \cdot \frac{(Lcore + Lgap)}{(Lcore \cdot \mu air + Lgap \cdot \mu r)}$ $\mu eq = 254.765$ Calculate magnetizing inductance of primary winding using Where:
$Lmag = \mu o \cdot \mu r \cdot \frac{N^2 \cdot Ae}{Le}$ Ae is effective crossectional area
Le is effective path length $Lmag := 4 \cdot \pi \cdot 10^{-7} \cdot \mu eq \cdot N^2 \cdot \frac{Ae}{(Lgap + Lcore)}$ $Lmag = 2.521 \times 10^{-5}$ This tells us using a RM-8 core geometry with relative permeability of 2200 combined with an air gap of 0.1 mm resulted in a calculated primary inductance of 25.2 uH which is within acceptable tolerance of the 27 uH magnetizing we desired.
First order leakage inductance estimation based on coupling coefficient number (e.g. K=0.995) from experience.
Set Coupling coefficient Kc:=0.995
Leakage inductance Lk:=(1−Kc)·Lmag Lk=1.261×10$^{-7}$
DC Resistance winding measurement is next obtained.

Open/short circuit measurement to obtain magnetizing and leakage inductances.

In step 950, the resonant capacitance Cin is calculated as in the following example:

Select a large enough Co such that the capacitance, plus ESR (Effective series Resistance) at 2× switching frequency and ripple current, will meet and exceed specification. Here set Co to 220 uF.

Ripple current at 7.5 A output is about 5.6 A (from simulation data)

ESR (Effective Series Resistance) of output capacitor Co ESRCo:=1·10$^{-3}$ For high performance part Set Output Capacitance Co to Co:=220·10$^{-6}$ Ripple frequency fripple:=2·fs Impandence of Capacitor in series with Resistor $ZCR =$ $$\sqrt{\left(\frac{1}{2 \cdot \pi \cdot f \cdot C}\right)^2 + R^2}$$

Effective Impedance of Output Capacitor at 1 MHz (2×500 KHz) is given by:

$$ZCo := \sqrt{\left(\frac{1}{2 \cdot \pi \cdot \text{fripple} \cdot Co}\right)^2 + ESRCo^2} \quad ZCo = 1.234 \times 10^{-3}$$

From simulation Ripple current is Iripple:=5.6
Ripple voltage across output capacitor Vripple:=Iripple·ZCo Vripple=6.912×10$^{-3}$
Set Lin to be 10 times of leakage inductance to provide adequate input, resonant capacitance isolation.
Estimate Cin such that the natural resonant frequency between Cin and Leakage Inductance is lower than switching frequency of 500 KHz.
Input Capacitance of Resonant push-pull network Cin:=820·10$^{-9}$ $$fo = \frac{1}{2 \cdot \pi \cdot \sqrt{L \cdot C}} \quad \frac{1}{2 \cdot \pi \cdot \sqrt{Lk \cdot Cin}} = 4.95 \times 10^5$$

This tells us we need 820 nF for a 0.995 coupling coefficient. However, in simulation using actual component model value between 100 nF and 68 nF for Cin is sufficient to make a difference. This is due to the combined effect of parasitics and component model details. Cin has to be tuned by measuring the waveform periods.

Set S1 and S2 driving signals need to be non-overlapping. The dead-time is set to a value such that magnetizing current at turn off (~0.5 A) will charge output capacitance (or adjacent capacitance) of S1 or S1 from zero to two times input voltage. This guarantees proper ZVS commutation. In this example, the dead-time=250 nS at 500 KHz.

At step 960, the operating conditions are adjusted to fine tune the converter circuit, as in the following example for best optimization:

Adjust the value of Cin such that the resonant current satisfies the above resonant frequency mode operation.

Adjust the dead-time so that it is ¼ of the resonant period formed between Leakage inductance and adjacent capacitance of switch S1 or S2. This can be done by observing the voltage waveform between S1 or S2.

Adjust magnetizing inductance of the transformer such that it is just sufficient to provide ZVS at no load/light load (e.g. 10% load). This makes sure magnetizing current is not excessive.

Various optimization targets applied, like peak full load efficiency at a particular input voltage, light load ZVS condition, etc. They may not co-exist, and, if not, the designer needs to select the most important one(s).

Alternatively, one can generally get improvement in full-load efficiency by trading off a slightly lower magnetizing current, with turning off at finite current (above resonant frequency mode) to get best efficiency at full load. This enables the generation of the energy required for ZVS partly using magnetizing current and partly from the leakage inductance, with a finite load current at turn off. The side effect of this method is to make light load efficiency lower. Turning off a switch at finite current does not necessarily generate high turn-off switching loss, provided the adjacent (inherent or additional) capacitance of the switch is large enough and the switch is turned off quickly enough. This will make sure there is only a small voltage rise across the switch when switch current reduces to zero during the turn-off process, resulting in LVS (low voltage switching) or practically ZVS. MOSFET devices currently available will meet these criteria easily.

Figure 10:
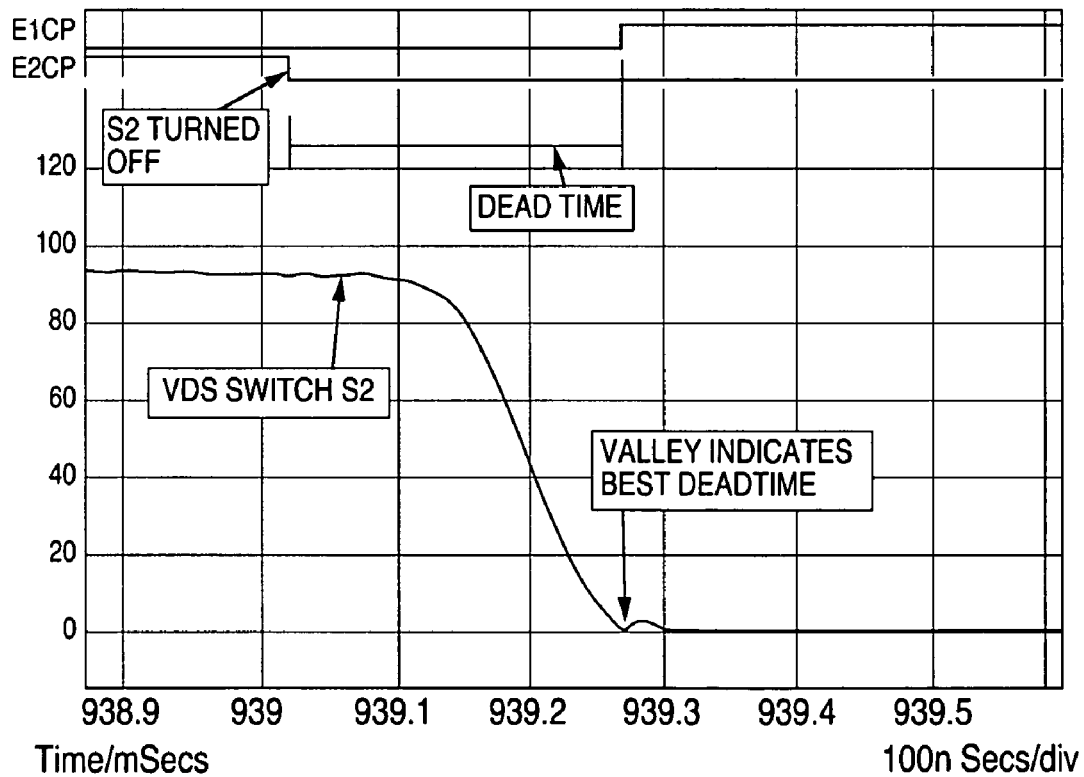
FIG. 10 is a graphical diagram illustrating waveforms during the design of a resonant push-pull converter that enables the determination of an optimum dead-time for the converter according to the present invention.

An example of how an optimum dead-time can be determined according to the present invention is illustrated in FIG. 10. As seen in FIG. 10, the drain to source voltage of the FET that is being used to implement switch S2 (Vds) is graphically obtained to show its characteristics as the capacitance Coss of switch S2 discharges after switch S2 is turned off. As is seen, the optimum dead time is the measured time duration that it takes for Vds to drop in voltage to zero volts.

Figure 11:
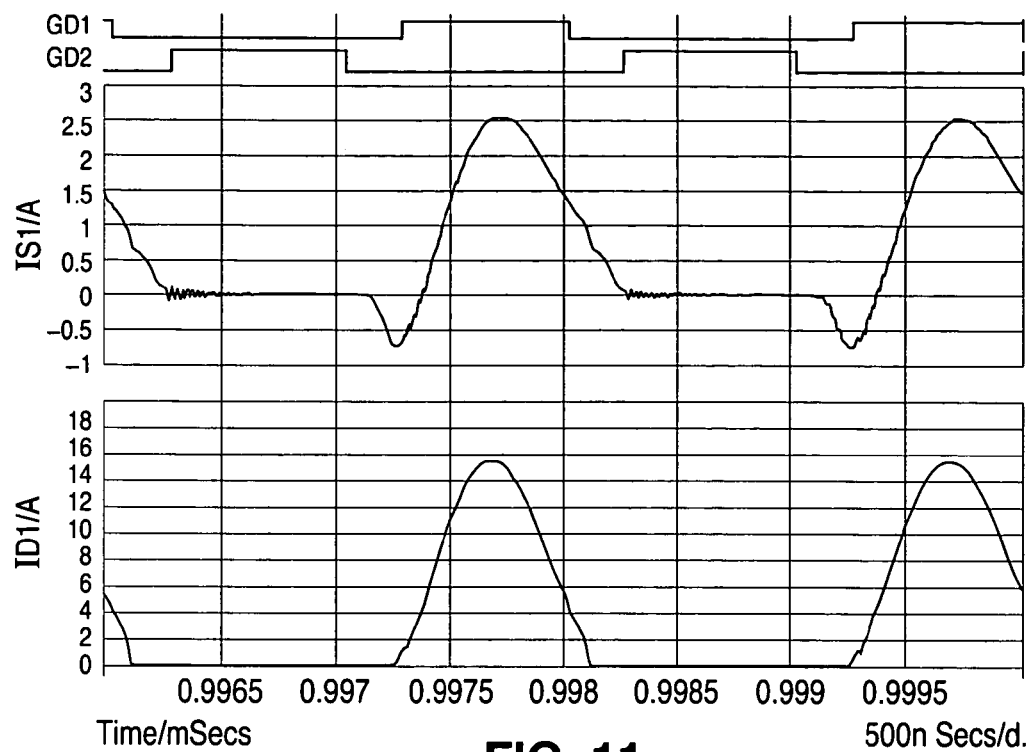
FIG. 11 is a graphical diagram illustrating waveforms during the operation of a resonant converter in accordance with the present invention.
Figure 12:
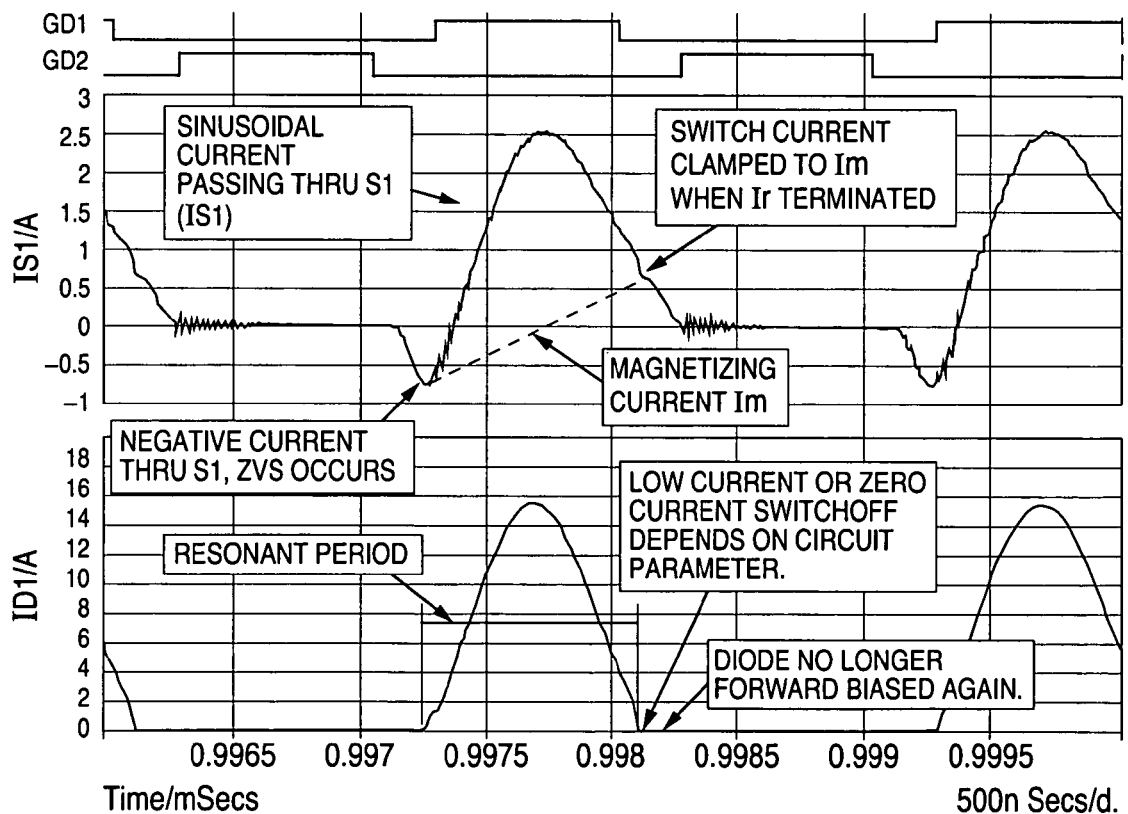
FIG. 12 is a graphical diagram illustrating key aspects of the waveforms shown in FIG. 11.

FIG. 11 is a graphical diagram illustrating waveforms during the operation of a resonant converter in accordance with the present invention. FIG. 12 is a graphical diagram illustrating key aspects of the waveforms shown in FIG. 11. As seen in FIG. 12, in the above resonant frequency operating mode, the turn-on period of switches S1 and S2 is shorter than the resonant period. The "resonant period" again is determined by measuring ¼ cycle period from the turn-on transition of the primary switch to the peak of the primary switch current. Table 2 below lists a set of exemplary transformer parameters.

TABLE 2

| GD1, GD2 | Gate drive signal of S1 and S2, 500 KHz, 250 ns deadtime |
|---|---|
| IS1 | Current waveform passing thru switch S1, RMS value 1.144 A |
| ID1 | Current waveform passing thru diode D1, RMS value 6.742 A |
| Vout | Output voltage of the converter 7.454 V |
| Cin | 100 nF such that resonant period is longer than S1 turn on period |
| Lm | Magnetizing inductance - center tap to phase, 27 µH |

A comparison between the prior art below resonant frequency mode of operation and the above resonant frequency mode of operation illustrates the improvement in efficiency of the converter 200 according to present invention. The relevant parameters, from the above design example, are as follows (with the prior art value listed first): (1) primary switch RMS current is 1.156 A versus 1.144 A; (2) secondary rectifier current is 7.418 A versus 6.742 A; (3) output voltage is 7.431V versus 7.454V; (4) primary switch RMS current per unit of output power is 002093 A versus 0.02057 A; (5) secondary rectifier current per unit of output power is 0.1343 A versus 0.1213 A; and (6) the percentage reduction of secondary RMS current is 0A versus 9.67%.

As is seen, therefore, the present invention reduces conduction losses by reducing the non-power delivery time period, also know as "dead-time", which reduces unnecessary magnetizing current induced conduction loss on the primary side. Moreover, the present invention advantageously provides the use of a higher switching frequency for the same transformer parameters, thereby reducing the output ripple with the same output capacitance. Furthermore, the present invention advantageously reduces the secondary rectifier RMS current by altering the form factor of the secondary waveform, effectively reducing the conduction loss on the rectifier. These advantageous are provided without affecting the characteristics of a ZVS or ZCS converter.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

What is claimed is:

1. A method for operating a push-pull convener in an above resonant frequency mode, the push-pull converter having a first power switch and a second power switch operating in alternating sequence with each other at a predetermined switching frequency, the push-pull converter having a transformer with a primary winding coupled to the first and second power switches and a secondary winding coupled to a secondary circuit, comprising:
   generating a resonant frequency from a leakage inductance of the transformer in series with a capacitance, wherein said capacitance comprises an input capacitor; and
   generating a switching frequency for the first and second power switches, wherein said switching frequency is higher than the resonant frequency.

2. The method of claim 1, wherein said capacitance further comprises an output capacitance, wherein said capacitance is an effective series capacitance of said input capacitor and said output capacitance.

3. The method of claim 1, wherein said capacitance further comprises a reflected secondary capacitance.

4. A resonant push-pull convener operating in an above resonant frequency mode, comprising:
   a primary circuit, comprising:
      an input capacitor;
      a leakage inductor connected in series with a capacitance, wherein the capacitance comprises an input capacitor;
      a magnetizing inductance connected in series with the leakage inductor; and
   first and second power switches connected in series with the magnetizing inductance;
      a secondary circuit, coupled to the primary circuit, comprising a rectifier circuit for producing a bi-directional conduction;
         wherein one of the first and second power switches is turned on and has a switching frequency that is higher than a resonant frequency of said converter.

5. The converter of claim 4, wherein the capacitance further comprises a reflected secondary capacitor.

6. The converter of claim 4, wherein the secondary circuit further comprises an output capacitor connected in series with the rectifier circuit.

7. The convener of claim 4, wherein the resonant frequency is produced from the leakage inductance in a transformer in series with the capacitance.

8. The convener of claim 4, wherein the rectifier circuit comprises a full-wave rectifier.

9. The convener of claim 4, wherein the rectifier circuit comprises a bridge rectifier.

10. The converter of claim 4, further comprising an isolation transformer having a primary winding connected to the primary circuit and a secondary winding connected to the secondary circuit.

11. The convener of claim 6, further comprising an output inductor, connected in series with the output capacitor, for reducing an output noise and ripple.

12. The convener of claim 4, further comprising a capacitor, connected in series with the output inductor, for reducing output noise and ripple.

13. The converter of claim 4, wherein the first and second power switches operate in alternating sequence such that the first power switch is turned ON when the second power switch is turned OFF, or the second power switch is turned ON when the first power switch is turned OFF, the first and second power switches being out of phase with each other by 180 degrees.

* * * * *